US009996242B2

(12) United States Patent
Nishihashi

(10) Patent No.: US 9,996,242 B2
(45) Date of Patent: Jun. 12, 2018

(54) COMPOSITE GESTURE FOR SWITCHING ACTIVE REGIONS

(71) Applicant: DENSO CORPORATION, Kariya, Aichi-pref. (JP)

(72) Inventor: Shigeaki Nishihashi, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 563 days.

(21) Appl. No.: 14/391,081

(22) PCT Filed: Mar. 25, 2013

(86) PCT No.: PCT/JP2013/001985
§ 371 (c)(1),
(2) Date: Oct. 7, 2014

(87) PCT Pub. No.: WO2013/153750
PCT Pub. Date: Oct. 17, 2013

(65) Prior Publication Data
US 2015/0067586 A1 Mar. 5, 2015

(30) Foreign Application Priority Data
Apr. 10, 2012 (JP) ................................. 2012-089546

(51) Int. Cl.
*G06F 3/0485* (2013.01)
*G06F 3/0488* (2013.01)
(Continued)

(52) U.S. Cl.
CPC ........ *G06F 3/0485* (2013.01); *G06F 3/03547* (2013.01); *G06F 3/0482* (2013.01);
(Continued)

(58) Field of Classification Search
CPC .. G06F 3/0485; G06F 3/03547; G06F 3/0482; G06F 3/04842; G06F 3/0488;
(Continued)

(56) References Cited

U.S. PATENT DOCUMENTS 5,809,267 A * 9/1998 Moran ................ G06F 3/04883
715/863
6,711,474 B1 * 3/2004 Treyz ..................... G01C 21/26
455/414.1
(Continued)

FOREIGN PATENT DOCUMENTS

JP 2005022510 A 1/2005
JP 2005024918 A 1/2005
(Continued)

OTHER PUBLICATIONS

Office Action dated Mar. 10, 2015 in corresponding JP Application No. 2012-089546 (with English translation).
(Continued)

*Primary Examiner* — Ajay M Bhatia
*Assistant Examiner* — Phoebe X Pan
(74) *Attorney, Agent, or Firm* — Harness, Dickey & Pierce, P.L.C.

(57) ABSTRACT

A display system that is configured to select one of multiple display regions as an active region and which can avoid complicated operations for selecting an icon is provided. In the display system, one of the display regions is selected as an active region by an input operation to an input screen, and an icon in the active region is selected by another input operation to the input screen. The display system stores a specific input operation in advance as a switching operation, and determines whether an input operation is the switching operation. When the input operation is determined as the switching operation, the display region corresponding to the
(Continued)

switching operation is selected as the active region, and the icon in the active region is displayed in a selectable state.

12 Claims, 15 Drawing Sheets

(51) Int. Cl.
*G06F 3/0482* (2013.01)
*G06F 3/0484* (2013.01)
*G06F 3/0354* (2013.01)

(52) U.S. Cl.
CPC ........ *G06F 3/0488* (2013.01); *G06F 3/04842* (2013.01); *G06F 3/04883* (2013.01); *G06F 2203/0339* (2013.01); *G06F 2203/04808* (2013.01)

(58) Field of Classification Search
CPC ......... G06F 3/04883; G06F 2203/0339; G06F 2203/04808
See application file for complete search history.

(56) References Cited

U.S. PATENT DOCUMENTS

| | | | | |
|---|---|---|---|---|
| 6,909,407 | B1* | 6/2005 | Schradi | B60K 35/00 345/156 |
| 7,084,859 | B1* | 8/2006 | Pryor | G01C 21/3664 345/156 |
| 7,126,583 | B1* | 10/2006 | Breed | B60K 35/00 345/158 |
| 8,510,668 | B1* | 8/2013 | Raskin | G06F 3/0484 715/255 |
| 8,643,605 | B2* | 2/2014 | Yu | G06F 3/04883 345/157 |
| 9,292,111 | B2* | 3/2016 | Westerman | G06F 3/038 |
| 2004/0122572 | A1* | 6/2004 | Ichinose | B60K 35/00 701/36 |
| 2004/0263479 | A1 | 12/2004 | Shkolnikov | |
| 2004/0263491 | A1* | 12/2004 | Ishigaki | G06F 3/04883 345/177 |
| 2006/0085767 | A1* | 4/2006 | Hinckley | G06F 3/04842 715/863 |
| 2006/0092177 | A1* | 5/2006 | Blasko | G04G 21/08 345/619 |
| 2006/0097994 | A1* | 5/2006 | Miyakoshi | G01C 21/3664 345/173 |
| 2006/0161870 | A1* | 7/2006 | Hotelling | G06F 3/0485 715/863 |
| 2006/0164382 | A1* | 7/2006 | Kulas | G06F 1/1626 345/156 |
| 2006/0262103 | A1* | 11/2006 | Hu | G06F 3/023 345/173 |
| 2007/0256027 | A1* | 11/2007 | Daude | B60K 35/00 715/810 |
| 2008/0039961 | A1* | 2/2008 | Metsch | G06F 3/0481 700/83 |
| 2008/0059057 | A1* | 3/2008 | Tengler | G01C 21/3626 701/465 |
| 2008/0301587 | A1* | 12/2008 | Baumann | B60K 35/00 715/841 |
| 2008/0309634 | A1* | 12/2008 | Hotelling | G06F 1/1626 345/173 |
| 2009/0085880 | A1* | 4/2009 | Vitale | B60R 11/0264 345/173 |
| 2009/0273563 | A1* | 11/2009 | Pryor | B60K 35/00 345/157 |
| 2010/0231550 | A1* | 9/2010 | Cruz-Hernandez | G06F 3/0488 345/174 |
| 2010/0241958 | A1* | 9/2010 | Fish | G06F 3/04883 715/702 |
| 2010/0313156 | A1* | 12/2010 | Louch | G06F 3/0481 715/769 |
| 2011/0164062 | A1 | 7/2011 | Nakamura et al. | |
| 2011/0169750 | A1* | 7/2011 | Pivonka | B60K 35/00 345/173 |
| 2011/0316879 | A1* | 12/2011 | Chikahisa | G01C 21/3664 345/629 |
| 2012/0030567 | A1* | 2/2012 | Victor | G06F 3/0482 715/702 |
| 2012/0262386 | A1* | 10/2012 | Kwon | G06F 3/04886 345/173 |
| 2013/0167077 | A1* | 6/2013 | Nishihashi | G06F 3/0484 715/800 |
| 2013/0205244 | A1* | 8/2013 | Decker | G06F 17/21 715/777 |
| 2015/0242102 | A1* | 8/2015 | Enami | G06F 3/0488 345/680 |
| 2015/0346851 | A1* | 12/2015 | Nishihashi | G06F 3/0488 345/173 |
| 2016/0167517 | A1* | 6/2016 | Nishihashi | B60K 35/00 345/174 |

FOREIGN PATENT DOCUMENTS

| | | |
|---|---|---|
| JP | 2008-507754 | 3/2008 |
| JP | 2009129171 A | 6/2009 |
| JP | 2010067139 A | 3/2010 |
| JP | 2011170603 A | 9/2011 |

OTHER PUBLICATIONS

International Search Report and Written Opinion (in Japanese with English Translation) for PCT/JP2013/001985, dated Jun. 25, 2013; ISA/JP.

Office Action in Corresponding JP Application No. 2012-089546 dated Aug. 5, 2014 (Japanese with English Translation).

* cited by examiner

COMPOSITE GESTURE FOR SWITCHING ACTIVE REGIONS

CROSS-REFERENCE TO RELATED APPLICATIONS

This application is a U.S. National Phase Application under 35 U.S.C. 371 of International Application No. PCT/JP2013/001985 filed on Mar. 25, 2013 and published in Japanese as WO 2013/153750 A1 on Oct. 17, 2013. The application is based on and claims the benefit of priority from Japanese Patent Application No. 2012-089546 filed on Apr. 10, 2012. The entire disclosures of all of the above applications are incorporated herein by reference.

FIELD OF THE INVENTION

The present disclosure relates to a display system in which multiple display regions are defined on a display screen, and to a display device and an operating device which are for the display system.

BACKGROUND ART

Patent Document 1, for example, discloses an in-vehicle display device in which multiple frames are defined on a display screen and a selective image section displayed in each frame can be selected with a cursor. In such an in-vehicle display device, one of the multiple frames is an active frame of which the selective image section is selectable. Then, the active frame is switched to another frame among the multiple frames, when an operation is inputted to an inter-frame jump button provided in a remote controller.

RELATED ART DOCUMENT

Patent Document

[Patent Document 1] JP-A-2005-22510

SUMMARY OF INVENTION

Studies of the inventor of the present application revealed that in the in-vehicle display device disclosed by Patent Document 1, an operator can move a cursor to a desired selective image section within an active frame by inputting an operation to a direction instruction button provided in a remote controller. However, according to such a configuration, unless an operator switches his input operation target from a direction instruction button to an inter-frame jump button, the operator cannot perform continuously the switching operation of switching an active frame and the selection operation of selecting a selective image section in the active frame. Therefore, when the operator is going to select a selective image section displayed in a non-active frame, it is likely that the operator is forced to perform complicated operations.

The present disclosure has been made in view of the above difficulty and has an object to provide a technology in which complicated operations for selecting a selective image section can be avoided, even in a configuration where multiple display regions such as frames are defined and one of them is an active region.

A display system according to an example of the present disclosure defines, on a display screen, multiple display regions. Each display region displays selective image sections, which are to be selected by an operation inputted into an input screen. The display system includes an input screen, a display screen, a determination unit, and a switching unit. The input screen is located apart from the display screen and inputs a selection operation for selecting the selective image section. The display screen displays, as an active region, one display region selected from among the multiple display regions in a manner that the selective image sections on the active area are selectable based on the selection operation. A specific operation to be inputted to the input screen is pre-stored as a switching operation in the determination unit. The determination unit determines whether the switching operation is inputted to the input screen. The switching unit switches the active region from the one display region to another display region of the multiple display regions when the determination unit determines that the switching operation is inputted.

According to such a display system, when the operator of the display system inputs to the input screen a specific switching operation stored in advance, the active region in which the selective image sections are selectable switches from one display region, which has been the active region till then, to another display region. Therefore, the operator can perform continuously the switching operation of switching the active region among the multiple display regions, and the selection operation of selecting the selective image section in the display region chosen as the active region, while continuing the input of the operation to the input screen. In this way, even in the display system in which multiple display regions for displaying the selective image sections are defined and one of the multiple display regions is chosen as the active region, it is possible to avoid complicated operations for selecting a desired selective image section.

BRIEF DESCRIPTION OF THE DRAWINGS

The above and other purpose, feature, and advantage of the present disclosure will become more apparent from the below detailed description made with reference to the accompanying drawings, in which.

DESCRIPTION OF EMBODIMENTS

Hereinafter, embodiments will be explained in detail with reference to the accompanying drawings. Throughout the embodiments, like references are used to refer to like parts, and the duplicated explanation thereof may be omitted. When only a part of the configuration is explained in an embodiment, the other part of the configuration can refer to the precedent explanation made for other embodiments. Not only a combination of configurations explicitly shown in each embodiment but also a combination of parts of configurations of embodiments, even if not explicitly shown, is also possible as long as no trouble occurs in particular in the combination.

First Embodiment

Figure 1:
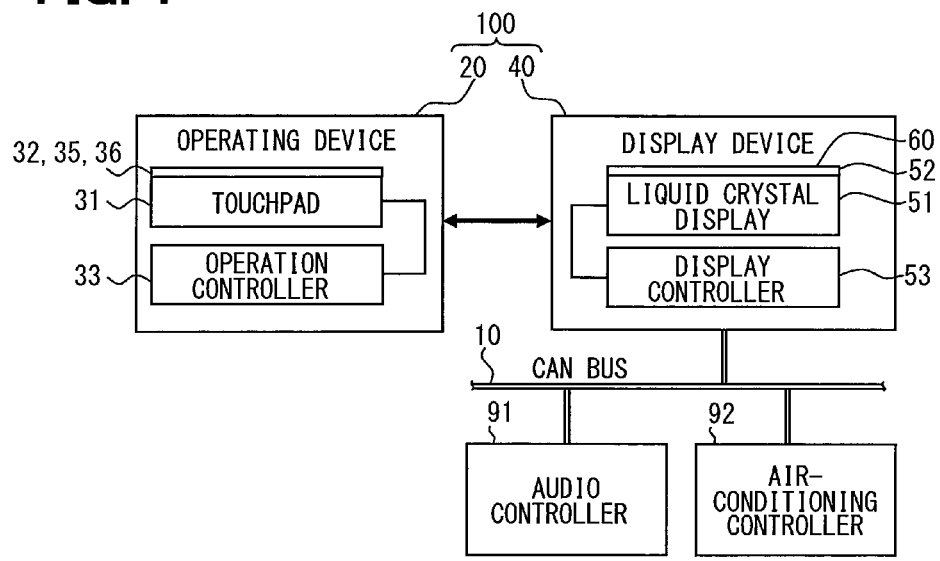
FIG. 1 is a drawing illustrating a configuration of a display system according to a first embodiment.
Figure 2:
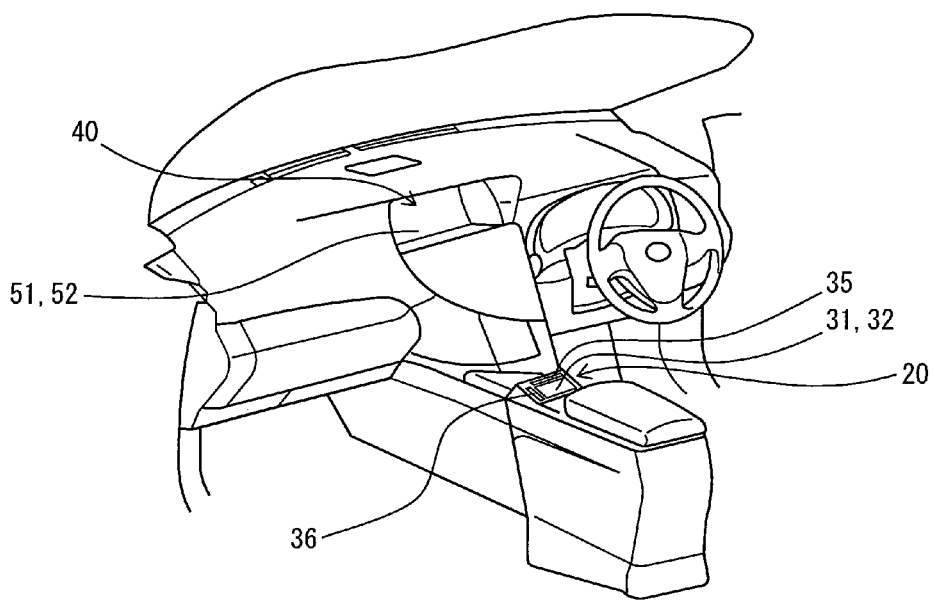
FIG. 2 is a drawing illustrating an arrangement of a display screen and an input screen in a passenger compartment.
Figure 3:
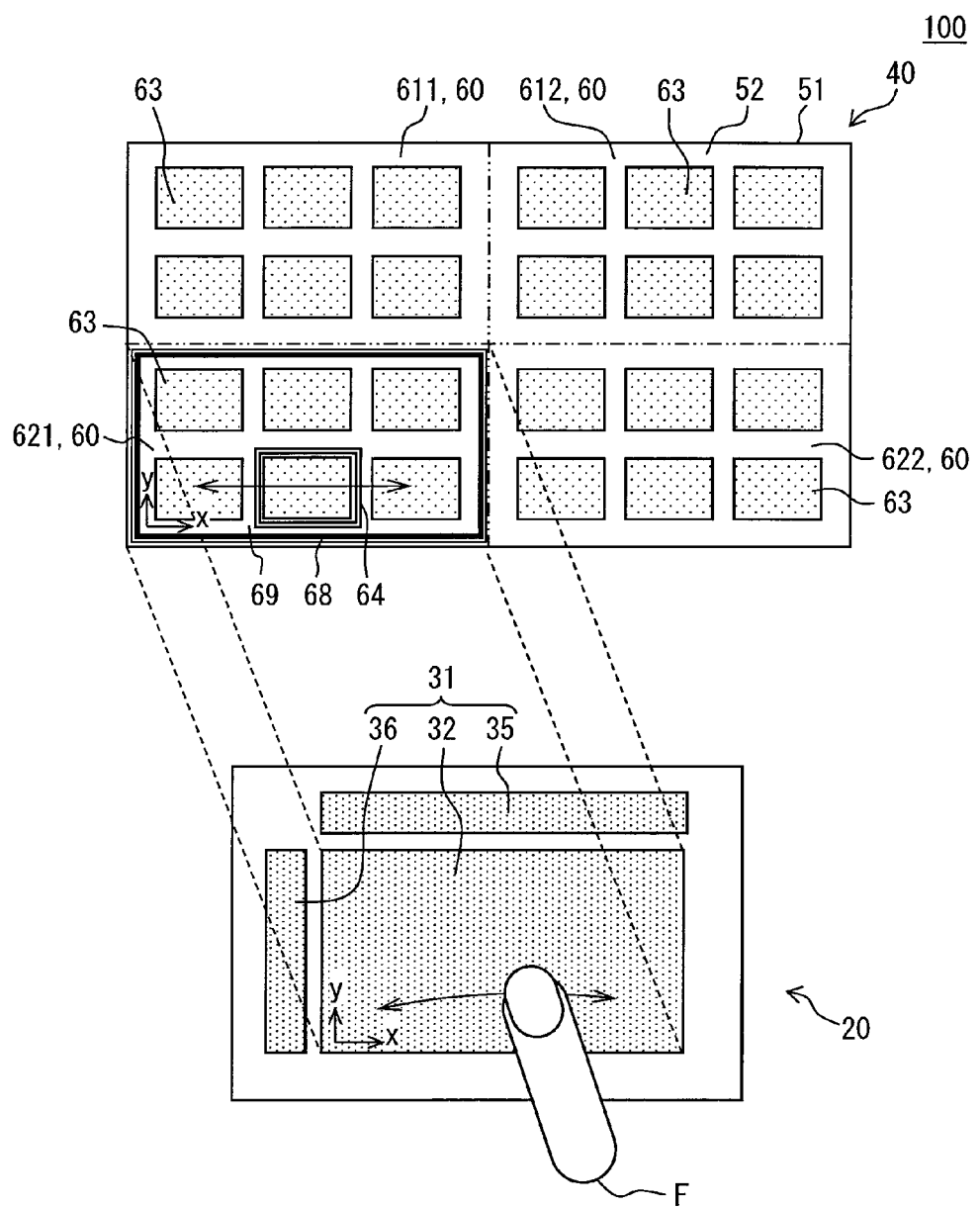
FIG. 3 is a drawing illustrating an image displayed on the display screen and correspondence of the display screen and the input screen.
Figure 4:
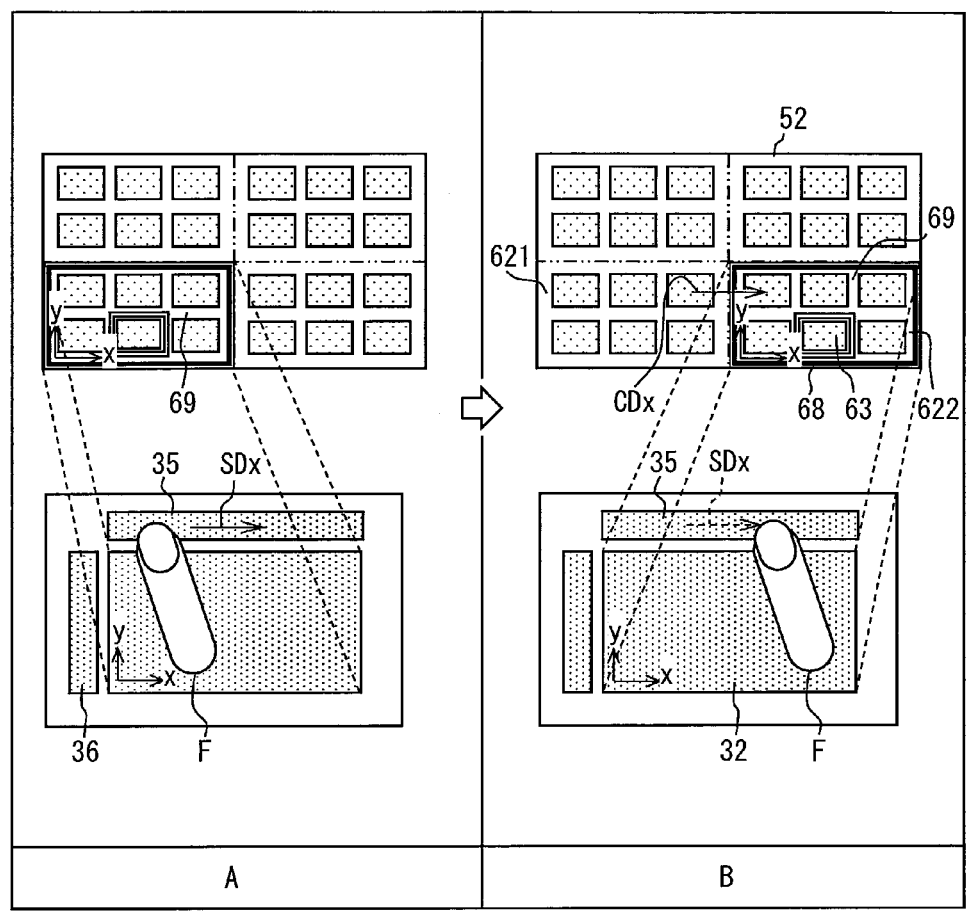
FIG. 4 is a drawing illustrating the movement of an active region changing in the x-axis direction by an operation to a first sub input screen.

A display system 100 according to the first embodiment illustrated in FIG. 1 includes an operating device 20, a display device 40, etc. As illustrated in FIG. 2, the operating device 20 is installed in a center console of a vehicle, and exposes a main input screen 32 located within the easy reach of an operator's hand. The display device 40 is installed in an instrument panel of the vehicle, and exposes a display screen 52 directed to the driver's seat so as to be viewed by the operator. The display system 100 displays an image as schematically illustrated in FIG. 3 on the display screen 52. First, with reference to FIG. 3, the details of the image displayed on the display screen 52 are explained.

The image displayed on the display screen 52 includes multiple icons 63 each related to a prescribed function. Each icon 63 is formed in, for example, a rectangular shape and includes a character which indicates the related function and a graphic which is associated with the function concerned. The display coordinate system defined on the display screen 52 corresponds to the input coordinate system defined on the main input screen 32. Therefore, when an operation by an operator is inputted into a specific position on the main input screen 32, the icon 63 displayed on the corresponding position on the display screen 52 is set to a selected state. At this time, the icon 63 in the selected state is surrounded by a focus 64 which is an image area in the shape of a rectangular frame. By the procedure as described above, the display device 40 performs processing related to the icon 63 set to the selected state. The operation to be inputted by the operator includes an operation of tapping the main input screen 32 with a fingertip, etc. (hereinafter called a "tap"), a simple press, contact, etc.

In addition, multiple display regions 60 are defined on the display screen 52. The display screen 52 according to the first embodiment is divided into four regions, for example. For convenience, it is assumed that in the display screen 52, a display region located in the upper left is labeled as 611, a display region located in the upper right is labeled as 612, a display region located in the lower left is labeled as 621, and a display region located in the lower right is labeled as 622. One of these four display regions 611-622 is selected as an active region 69. The display region selected as the active region 69 (for example, the display region 621 in FIG. 3) is surrounded by an active-region indicating frame 68 in the shape of a rectangular frame. In the active region 69, the icons 63 are selectable by the selection operation inputted into the main input screen 32. In the first embodiment, an absolute input method is adopted in which the position where the operator's finger F touches on the main input screen 32 (hereinafter called an "input position") corresponds to the position in the active region 69. Naturally, it is also possible to adopt a relative input method in which the operation amount inputted to the main input screen 32 corresponds to the shift amount of an image generated on the display screen 52.

Next, the configuration of the display system 100 is explained in detail with reference to FIG. 1 and FIG. 3. The operating device 20 is located apart from the display device 40, and functions as a device for selecting the icon 63 displayed on the display screen 52 by means of remote operation. The operating device 20 is coupled to the display device 40 and outputs the operation information inputted to the main input screen 32 to the display device 40 in order to select the icon 63. The operating device 20 is configured with a touchpad 31, an operation control unit 33, etc.

The touchpad 31 is a capacitive sensing type and is configured to detect an operation inputted by the operator. The touchpad 31 includes the above-described main input screen 32 formed in the shape of a rectangular plate, and a first sub input screen 35 and a second sub input screen 36, both formed alongside the main input screen 32 concerned. The first sub input screen 35 is located along the outer edge of the main input screen 32 in the longitudinal direction, extending like a long and narrow strip. The second sub input screen 36 is located along the outer edge of the main input screen 32 in the direction perpendicular to the longitudinal direction, extending like a long and narrow strip. Each of the sub input screens 35 and 36 is located in the opposite side to the operator, sandwiching the main input screen 32 (refer to FIG. 2). The surface of each of the input screens 32, 35, and 36 is covered with an insulation sheet formed of insulating materials. In the inner side of each of the input screens 32, 35, and 36 covered with the insulation sheet, electrodes extending in the x-axis direction and electrodes extending in the y-axis direction are arranged in the shape of a grid. These electrodes are coupled to the operation control unit 33.

The operation control unit 33 is configured with a processor which performs various kinds of arithmetic processing, a RAM which functions as a working area of the arithmetic processing, a flash memory which stores a program for the arithmetic processing, and others. In addition, the operation control unit 33 is provided with a communication interface for exchanging information with the display device 40. The operation control unit 33 is coupled to the touchpad 31.

The operation control unit 33 measures the potential of each electrode of the touchpad 31 by executing a prescribed program. When an operator's finger F touches either of the input screens 32, 35, and 36, a charge is stored between the electrode and the finger F with the intervening insulation sheet. The operation control unit 33 detects an input screen which the operator's finger F touches, among the input screens 32, 35, and 36, on the basis of a change of the potential measured for each electrode, and furthermore finds the x-coordinate and y-coordinate of the input position by the finger F on the input screen concerned. Then, the operation control unit 33 outputs a signal indicating the detected input screen and the coordinates of the detected input position, as the operation information, to the display device 40 via the communication interface.

The display device 40 is coupled to a CAN bus (Controller Area Network bus) 10. In the in-vehicle communication network which couples multiple in-vehicle devices mounted in the vehicle, the CAN bus 10 is a transmission line for transmission of data among the in-vehicle devices. The display device 40 can exchange information with each of the in-vehicle devices coupled to the CAN bus 10 (for example, an audio control device 91 for controlling an audio equipment, and an air-conditioning control device 92 for controlling air-conditioning equipment). The display device 40 is provided with a display control unit 53 and a liquid crystal display 51.

The display control unit 53 includes a processor which performs various kinds of arithmetic processing, a RAM which functions as a working area of the arithmetic processing, a graphic processor which performs drawing of an image, a graphic RAM which functions as a working area of the drawing, and others. In addition, the display control unit 53 is configured with a flash memory which stores data for the arithmetic processing and the drawing, a communication interface coupled to the CAN bus 10, and a video output interface which outputs image data of a drawn image to the liquid crystal display 51. The display control unit 53 draws an image to be displayed on the display screen 52, on the basis of the information acquired from the CAN bus 10 and the information acquired from the operating device 20. Then, the display control unit 53 outputs successively the image data of the drawn image to the liquid crystal display 51 via the video output interface.

The liquid crystal display 51 is a dot matrix display which realizes color display by controlling multiple pixels arranged in the display screen 52. The liquid crystal display 51 displays an image by forming continuously, on the display screen 52, the image data acquired successively from the display control unit 53. The liquid crystal display 51 provides a driver with various kinds of information by displaying various kinds of images on the display screen 52.

In the configuration described above, an audio status image indicating the present operating state of an audio equipment, an air-conditioner status image indicating the present operating state of air-conditioning equipment, etc. are assigned to each of the multiple display regions 611-622, for example. The audio status image is drawn on the basis of the information acquired from the audio control device 91, and includes icons 63 which are related with the function to adjust volume, the function to select a musical piece, etc.

The air-conditioner status image is drawn on the basis of the information acquired from the air-conditioning control device 92, and includes icons 63 which are related with the function to adjust the preset temperature in the passenger compartment, etc.

The display system 100 explained hitherto changes the display region selected as the active region 69 among the multiple display regions 611-622, according to the input to the touchpad 31. With reference to FIG. 4-FIG. 7, the following explains in detail multiple operations for moving the active region 69 on the display screen 52.

First, the explanation is made for the operation to move the active region 69 by the input to each of the sub input screens 35 and 36. The first sub input screen 35 and the second sub input screen 36 are input screens provided for the operation to switch the active region 69. As illustrated in the part A of FIG. 4, it is assumed that an operation of moving a finger F along the first sub input screen 35 in a specific direction SDx along the x-axis direction of the input coordinate system is inputted. Then, as illustrated in the part B of FIG. 4, the active region 69 moves on the display screen 52, in a direction CDx along the x-axis direction of the display coordinate system, the direction CDx being the corresponding direction to the specific direction SDx in which the finger F moves. As described above, the display region selected as the active region 69 changes from the lower left region 621 to the lower right region 622. In this way, the display region 622 is surrounded by the active-region indicating frame 68, and the icon 63 included in the display region 622 becomes selectable by the selection operation inputted into the main input screen 32.

Figure 5:
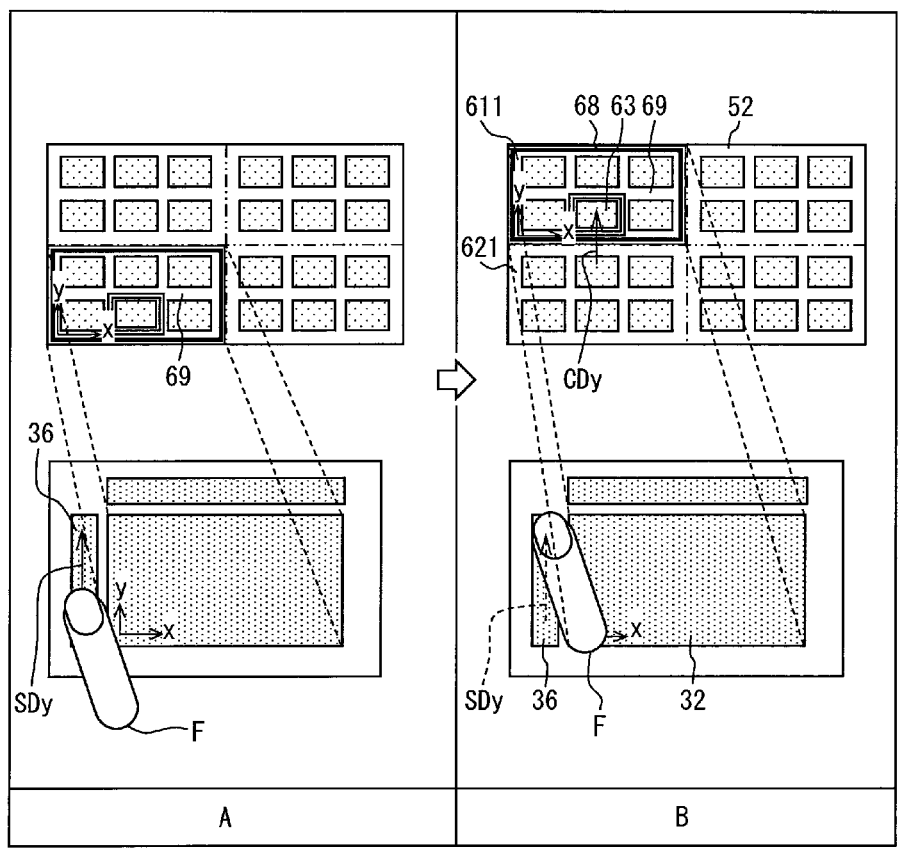
FIG. 5 is a drawing illustrating the movement of an active region changing in the y-axis direction by an operation to a second sub input screen.

As illustrated in the part A of FIG. 5, it is assumed that an operation of moving a finger F along the second sub input screen 36 in a specific direction SDy along the y-axis direction of the input coordinate system is inputted. Then, as illustrated in the part B of FIG. 5, the active region 69 moves on the display screen 52 in a direction CDy along the y-axis direction of the display coordinate system, the direction CDy being the corresponding direction to the specific direction SDy in which the finger F moves. As described above, the display region selected as the active region 69 changes from the lower left region 621 to the upper left region 611. In this way, the display region 611 is surrounded by the active-region indicating frame 68, and the icon 63 included in the display region 611 becomes selectable by the selection operation inputted into the main input screen 32.

Next, the operation to move the active region 69 by the input to the main input screen 32 is explained. In the display control unit 53 according to the first embodiment, a flick operation to the main input screen 32 with two fingers F is stored in advance as a switching operation for switching the active region 69. Accordingly, the operator can change the active region 69 suitably by inputting the above-described switching operation stored in advance, while continuing the input of the selection operation to the main input screen 32.

Figure 6:
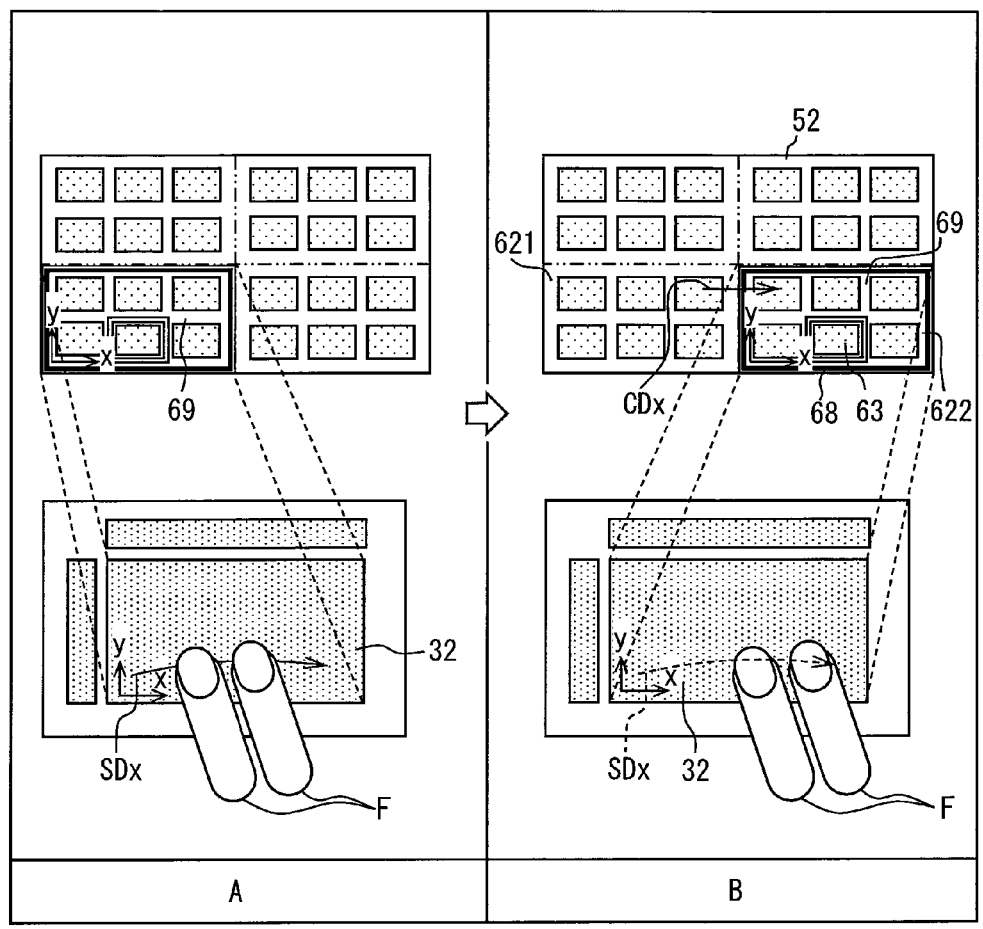
FIG. 6 is a drawing illustrating the movement of an active region changing in the x-axis direction by an operation to a main input screen in the display system according to the first embodiment.

As illustrated in the part A of FIG. 6, it is assumed that a flick operation with two fingers F in a specific direction SDx along the x-axis direction of the input coordinate system is inputted to the main input screen 32. Then, as illustrated in the part B of FIG. 6, the active region 69 moves on the display screen 52 in a direction CDx along the x-axis direction of the display coordinate system, the direction CDx being the corresponding direction to the specific direction SDx in which two fingers F move. As described above, the icon 63 included in the display region 622 which has been selected as the active region 69 and surrounded by the active-region indicating frame 68 becomes selectable by the selection operation inputted into the main input screen 32. Here, the flick operation expresses an operation of flipping the main input screen 32 along the plane surface. When explained in detail, it is an operation of moving a finger F along the x-y plane at a prescribed velocity or more quickly, in the state where the finger F is touching to the main input screen 32 and spacing out the finger F from the input screen 32 gradually. Naturally, in addition to such a flick operation, it is also possible to adopt, as a switching operation, a slide operation to move two fingers F along the main input screen 32, for example.

Figure 7:
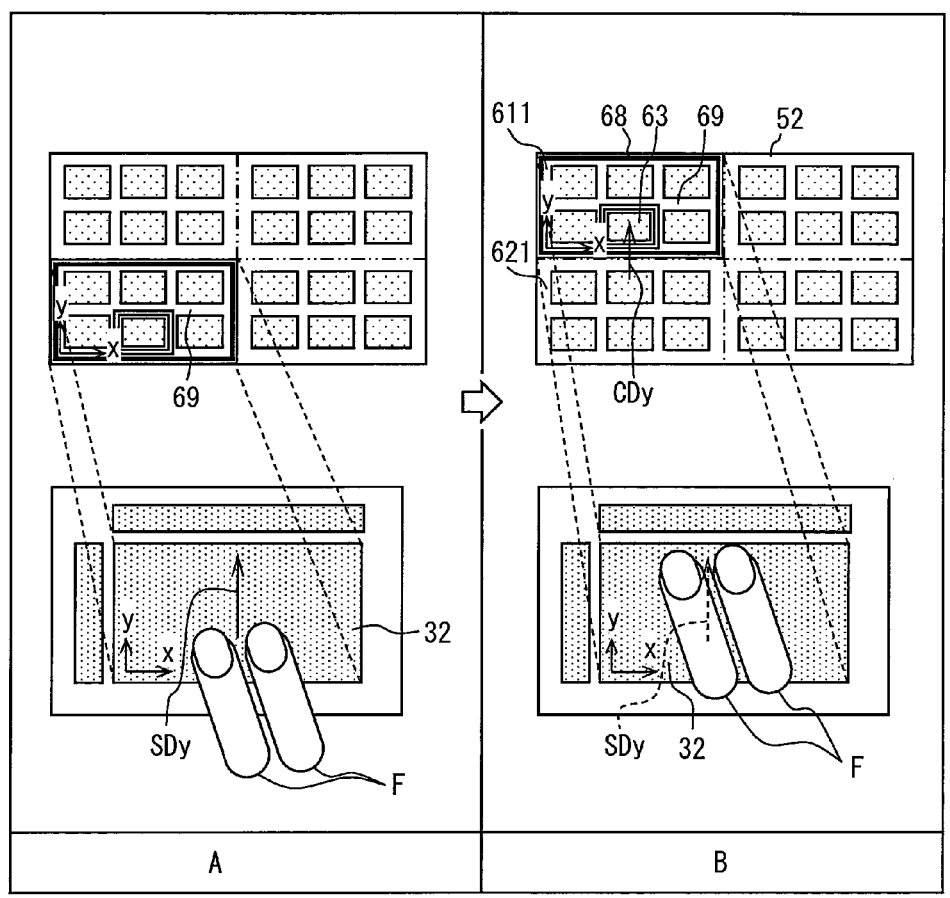
FIG. 7 is a drawing illustrating the movement of an active region changing in the y-axis direction by an operation to the main input screen in the display system according to the first embodiment.

As illustrated in the part A of FIG. 7, it is assumed that a flick operation with two fingers F in a specific direction SDy along the y-axis direction of the input coordinate system is inputted to the main input screen 32. Then, as illustrated in the part B of FIG. 7, the active region 69 moves on the display screen 52 in a direction CDy along the y-axis direction of the display coordinate system, the direction CDy being the corresponding direction to the specific direction SDy in which two fingers F move. As described above, the icon 63 included in the display region 611 which has been selected as the active region 69 and surrounded by the active-region indicating frame 68 becomes selectable by the selection operation inputted into the main input screen 32.

Figure 8:
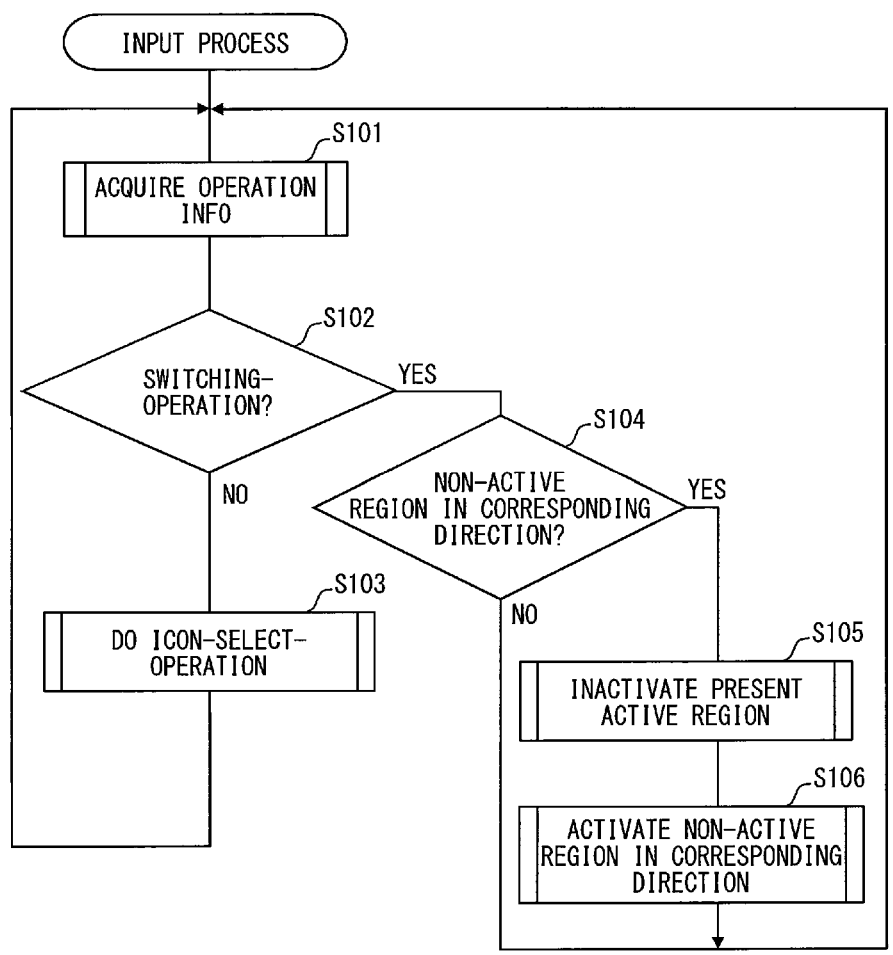
FIG. 8 is a flow chart illustrating an input process performed by a display control unit in the display system according to the first embodiment.

The process which realizes both the selection operation of the icon 63 and the switching operation of the active region 69 by the input of an operation to the main input screen 32 as described above (hereinafter called an "input process") will be explained in detail, with reference to FIG. 8. When the power of a vehicle is switched from OFF state to ON state, the input process illustrated in FIG. 8 is started by the display control unit 53, by the start of the electric power to be supplied to the display system 100. This input process is continued by the display control unit 53 until the electric power supply to the display system 100 is stopped.

At S101, the operation information including the coordinates of an operator's input position in the main input screen 32 is acquired from the operating device 20, and the flow advances to S102. At S102, it is determined whether an operation inputted into the main input screen 32 corresponds to the switching operation stored in advance, that is, to the flick operation with two fingers F, from the change of the coordinates of the input position acquired at S101. When it is determined at S102 that the operation by the operator is not the switching operation, the flow advances to S103. At S103, the operation acquired at S101 is regarded as the selection operation of the icon 63 in the active region 69, and the flow returns to S101.

On the other hand, when it is determined at S102 that the operation by the operator is a switching operation, the flow advances to S104. At S104, the direction in which multiple fingers F have moved along the main input screen 32 is assumed to be the specific direction SDx (or SDy) in the input coordinate system. In addition, the direction corresponding to the specific direction SDx (or SDy) is assumed to be the corresponding direction CDx (or CDy) in the display coordinate system. Furthermore, it is determined whether there is a non-active region in the corresponding direction CDx (or CDy) of the present active region 69. When a negative determination that there is no non-active region in the corresponding direction CDx (or CDy) of the present active region 69 is made at S104, it is estimated that the operation is an operational error and the flow returns to S101, maintaining the display of the display screen 52. On the other hand, when an affirmation determination is made at S104, the flow advances to S105.

At S105, the present active region 69 is changed to a non-active region, and the flow advances to S106. Accordingly, on the display screen 52, the active-region indicating frame 68 which has surrounded the active region 69 disappears. Then, at S106, a non-active region located in the corresponding direction CDx (or CDy) to the display region which has been the active region 69 until just before is newly changed to an active region 69, and the flow returns to S101. Accordingly, on the display screen 52, the display of the active-region indicating frame 68 surrounding the newly selected active region 69 is started. By the procedure at Steps S105 and S106, the active region 69 in which the icons 63 are selectable is switched from one display region 621 to another display region 622 (or 611) (refer to FIG. 6 and FIG. 7).

According to the first embodiment explained hitherto, the operator can perform continuously the switching operation for switching the active region 69 among the display regions 611-622 and the selection operation for selecting the icon 63 in the active region 69, while continuing the input to the main input screen 32. As described above, even in the display system 100 in which multiple display regions 611-622 for displaying the icon 63 are defined, and one of them is selected as the active region 69, it is possible to avoid complicated operations for selecting the desired icon 63.

In addition, according to the first embodiment, it is possible for the operator to perform the selection operation of the icon 63 by inputting an operation to the main input screen 32 with one finger, and it is possible to perform the switching operation of the active region 69 by inputting an operation to the main input screen 32 with two fingers. In this way, by assigning the operation with two fingers F as the switching operation, it becomes possible to switch from the selection operation to the switching operation by a simple modification of the operation mode that the number of fingers F is changed from one to two. Therefore, it is possible to realize the display system 100 which can perform the continuous selection operation and switching operation, smoothly and reliably.

According to the first embodiment, the corresponding direction CDx (or CDy) in which the active region 69 moves on the display screen 52 corresponds to the specific direction SDx (or SDy) in which the finger F is moved on the main input screen 32. Therefore, it is possible for the operator to change arbitrary one of the display regions 611-622 on the display screen 52 to the active region 69 freely, according to the direction in which two fingers F move on the main input screen 32. Therefore, it is possible to improve further the operability in the switching operation for switching the active region 69.

Furthermore, the flick operation set up as the switching operation in the first embodiment is an operation hard to be inputted at the time of the selection operation for selecting the icon 63. Therefore, by assigning the flick operation as the switching operation, it is possible to suppress an unintended switching of the active region 69 at the time of the selection operation. In this way, the operability of the display system 100 improves further due to further exertion of the reduction effect over an erroneous operation.

In addition, in the first embodiment, the input of operation to each of the sub input screens 35 and 36 which adjoin the main input screen 32 can also move the active region 69 on the display screen 52. Therefore, even when an operator performs operations without knowing that the flick operation with multiple fingers F is the switching operation, the operator concerned can switch the active region 69 by an operation on each of the sub input screens first sub input screen 35 and 36. In this way, by providing the sub input screens 35 and 36 separately from the main input screen 32, it is possible to realize the display system 100 which is easy to operate even if the operator's learning level is low.

Then, the function to detect an operation inputted, the function to determine whether the inputted operation is the switching operation or not, the function to switch the active region 69, and the function to select the icon 63 in the active region 69 may be achieved either by the display control unit 53 of the display device 40, as is the case with the first embodiment described above, or by the operation control unit 33 of the operating device 20.

In the first embodiment, the operator's finger F corresponds to an example of the operation body. The main input screen 32 corresponds to an example of the input screen. The operation control unit 33 or the display control unit 53 corresponds to the detection means (detection unit), the determination means (determination unit), the switching means (switching unit), and the image selection unit (image selection means). The icon 63 corresponds to the selective image section.

Second Embodiment

Figure 9:
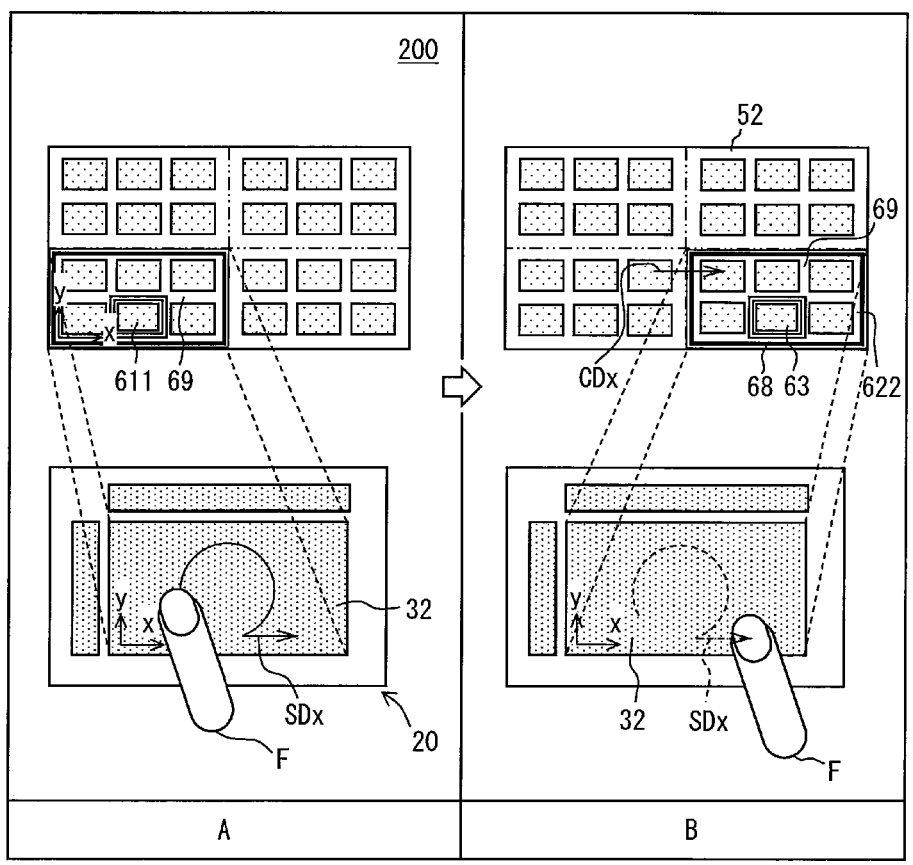
FIG. 9 is a drawing illustrating the movement of an active region changing in the x-axis direction by an operation to a main input screen in a display system according to a second embodiment.
Figure 10:
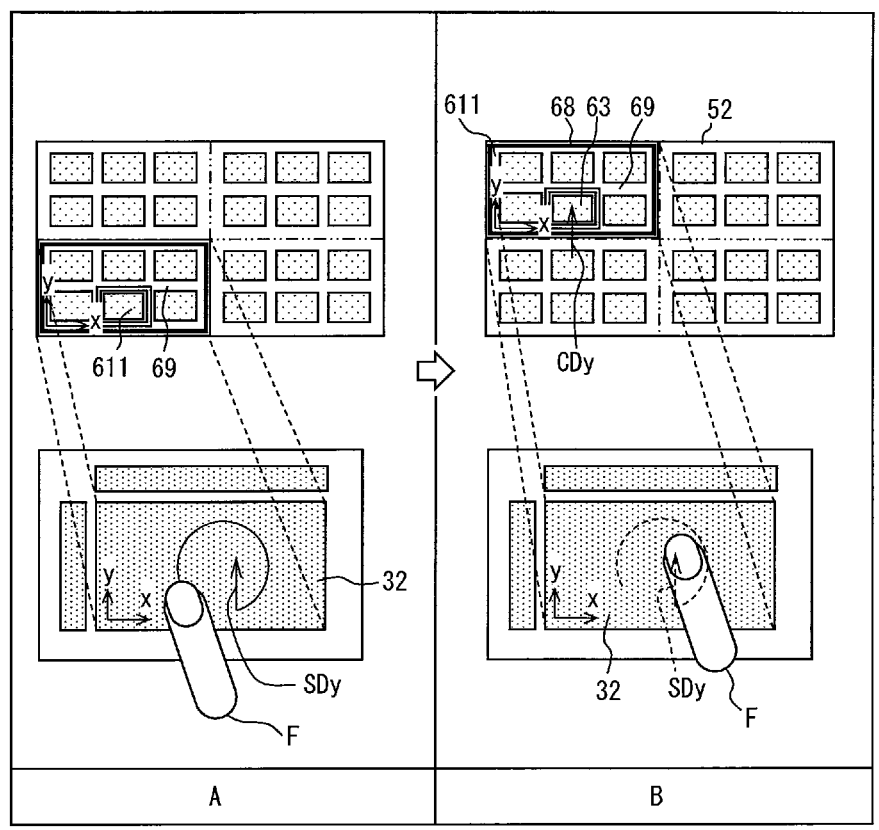
FIG. 10 is a drawing illustrating the movement of an active region changing in the y-axis direction by an operation to the main input screen in the display system according to the second embodiment.
Figure 11:
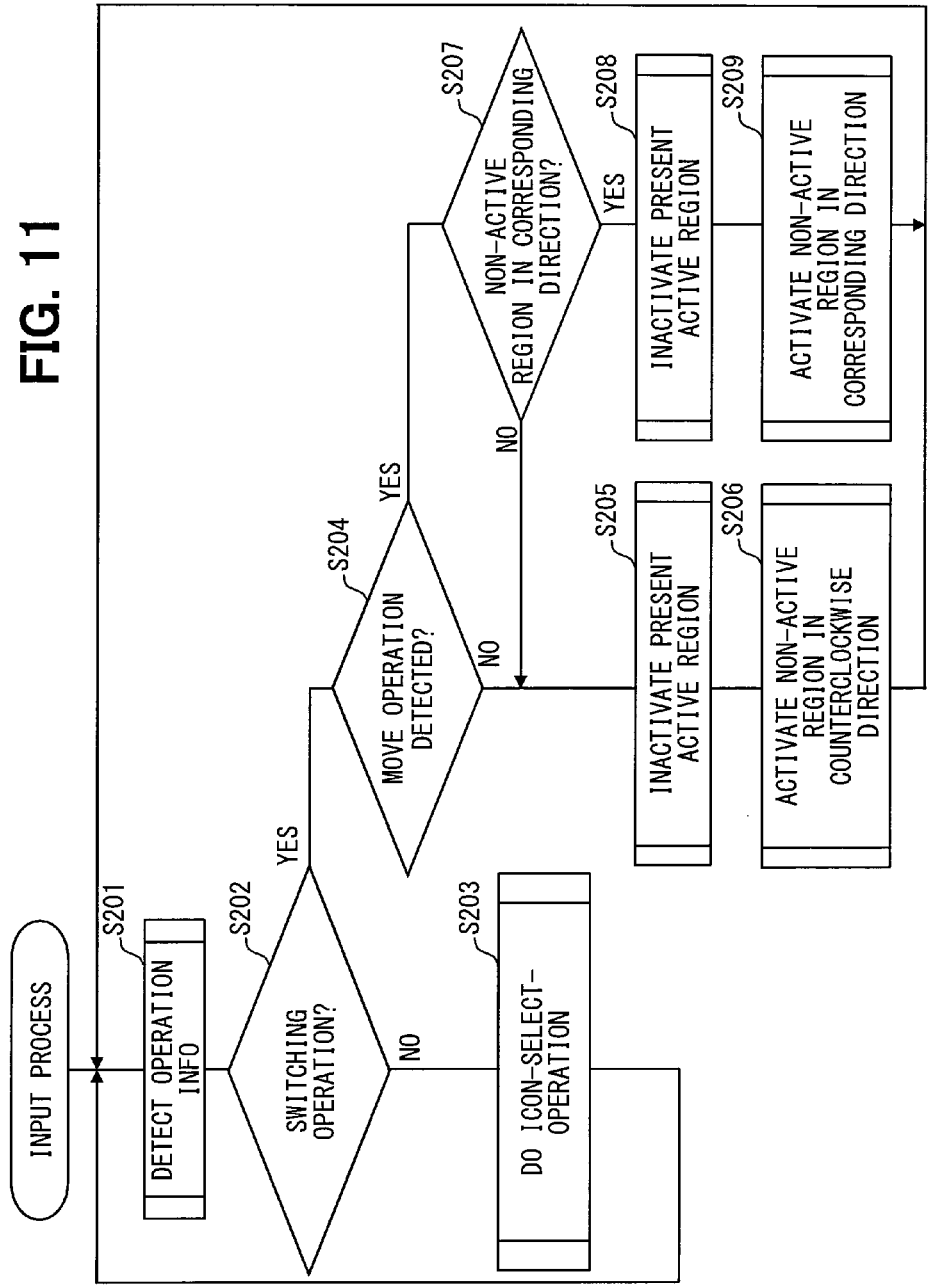
FIG. 11 is a flow chart illustrating an input process performed by an operation control unit in the display system according to the second embodiment.

The second embodiment illustrated in FIG. 9-FIG. 11 is a modified example of the first embodiment. In a display system 200 according to the second embodiment, an operation control unit 33 of an operating device 20 (refer to FIG. 1) performs an input process. In addition, an operation to move a finger F so as to draw a circle as a specific locus is stored in the operation control unit 33 in advance as a switching operation. Hereinafter, an operation to move the active region 69 by an input to the main input screen 32 is explained with reference to FIG. 9 and FIG. 10.

As illustrated in the part A of FIG. 9, it is assumed that an operation to move one finger F so as to draw a circle and then to move the finger F concerned in a specific direction SDx along the x-axis direction of the input coordinate system is inputted to the main input screen 32. Then, as illustrated in the part B of FIG. 9, the active region 69 moves on the display screen 52 in a direction CDx along the x-axis direction of the display coordinate system, the direction CDx being the corresponding direction to the specific direction SDx in which the finger F moves. As described above, the icon 63 included in the display region 622 which has been selected as the active region 69 and surrounded by the active-region indicating frame 68 becomes selectable by the selection operation inputted into the main input screen 32.

Furthermore, as illustrated in the part A of FIG. 10, it is assumed that an operation to move one finger F so as to draw a circle and then to move the finger F concerned in a specific direction SDy along the y-axis direction of the input coordinate system is inputted to the main input screen 32. Then, as illustrated in the part B of FIG. 10, the active region 69 moves on the display screen 52 in a direction CDy along the y-axis direction of the display coordinate system, the direction CDy being the corresponding direction to the specific direction SDy in which the finger F moves. As described above, the icon 63 included in the display region 611 which has been selected as the active region 69 and surrounded by the active-region indicating frame 68 becomes selectable state by the selection operation inputted into the main input screen 32.

The locus of the circle drawn with the finger F to the main input screen 32 may not be an exact perfect circle. In addition, the locus of the circle may be less than a full circle (for example, about a semicircle), as illustrated in FIG. 9 and FIG. 10.

In order to realize switching of the active region 69 as described above, the input process performed by the operation control unit 33 is explained in detail, with reference to FIG. 11. The input process illustrated in FIG. 11 is started by the operation control unit 33, by the start of the electric power to be supplied to the display system 200. This input process is continued by the operation control unit 33 concerned until the electric power supply to the display system 200 is stopped.

At S201, operation information including the coordinates of an input position with the finger F to the main input screen 32, etc. is acquired by detection, and the flow advances to S202. At S202, it is determined whether an operation inputted into the main input screen 32 corresponds to the switching operation stored in advance, that is, an operation of drawing a circle with a finger F, from the change of the coordinates of the input position detected at S201. When it is determined at S202 that the operation by the operator is not the switching operation, the flow advances to S203. At S203, the operation detected at S201 is regarded as the selection operation of the icon 63 in the active region 69, and the operation information including the coordinates of the input position, etc. is outputted to the display control unit 53, and the flow returns to S201. Accordingly, the display control unit 53 sets to a selectable state the icon 63 locating at the position corresponding to the coordinates acquired from the operation control unit 33.

When it is determined at S202 that the operation by the operator is the switching operation, the flow advances to S204. At S204, after the switching operation, it is determined whether the move operation which follows the switching operation and moves a finger F in a specific direction SDx (or SDy) in the input coordinate system has been detected. When it is determined at S204 that the move operation of the finger F in the specific direction SDx (or SDy) has not been detected, the flow advances to S205. At S205, a command is outputted to the display control unit 53, indicating that the present active region 69 is to be changed to a non-active region, then the flow advances to S206. At S206, a command is outputted to the display control unit 53, indicating that the non-active region located in the counter-clockwise direction to the display region which has been set as the active region 69 until just before is to be changed to the active region 69, then the flow returns to S201.

When it is determined at S204 that the move operation of the finger F to the specific direction SDx (or SDy) has been detected, the flow advances to S207. At S207, the direction corresponding to the specific direction SDx (or SDy) to which the finger F has moved on the main input screen 32 is defined as the corresponding direction CDx (or CDy). Furthermore, it is determined whether there is a non-active region in the corresponding direction CDx (or CDy) of the present active region 69. At S207, when a negative determination that there is no non-active region in the corresponding direction CDx (or CDy) of the present active region 69 is made, S205 and S206 described above are performed in this order, and the flow returns to S201. On the other hand, when an affirmation determination is made at S207, the flow advances to S208. At S208, as is the case with S205, a command is outputted to the display control unit 53, indicating that the present active region 69 is to be changed to a non-active region, then the flow advances to S209. At S209, a command is outputted to the display control unit 53, indicating that the non-active region located in the corresponding direction CDx (or CDy) to the display region which has been set as the active region 69 until just before is to be changed to the active region 69, then the flow returns to S101. According to the control of the display control unit 53 performed at either S205 followed by S206 or S208 followed by S209, the active region 69 in which the icons 63 are selectable is switched from one display region 621 to another display region 622 (or 611) (refer to FIG. 9 and FIG. 10).

According to the second embodiment explained hitherto, the operator can also perform continuously the switching operation for switching the active region 69 and the selection operation for selecting the icon 63, while continuing the input to the main input screen 32. Therefore, even by the display system 200 according to the second embodiment, it is possible to avoid complicated operations for selecting the desired icon 63.

In addition, according to the second embodiment, the pattern of the circle specified as the switching operation is a pattern which is not drawn in the selection operation for selecting the icon 63. Therefore, it is possible to suppress an unintended switching of the active region 69 at the time of the selection operation. In this way, in addition to the fact that the switching operation and the selection operation can be performed, while continuing the input of an operation to the main input screen 32, the operability of the display system 200 improves further due to the exertion of the reduction effect over an erroneous operation.

In the second embodiment, the specific direction SDx (or SDy) in which the finger F is moved after the switching operation corresponds to the corresponding direction CDx (or CDy) in which the active region 69 moves on the display screen 52. Accordingly, it is possible for the operator to change arbitrary one of the display regions 611-622 to the active region 69 freely, according to the direction in which the finger F moves after the switching operation. Therefore, it is possible to improve further the operability in the switching operation for switching the active region 69.

In the second embodiment, the operation control unit 33 or the display control unit 53 corresponds to one example of the detection means (detection unit), the determination means (determination unit), the switching means (switching means), and the image selection unit (image selection means). In the display system 200 which combines the operating device 20 and the display device 40, etc., the function to detect an operation inputted, the function to determine whether the inputted operation is the switching operation or not, the function to switch the active region 69, and the function to select the icon 63 in the active region 69 may be achieved by the operation control unit 33 as described above, or may be achieved by the display control unit 53 of the display device 40.

Third Embodiment

Figure 12:
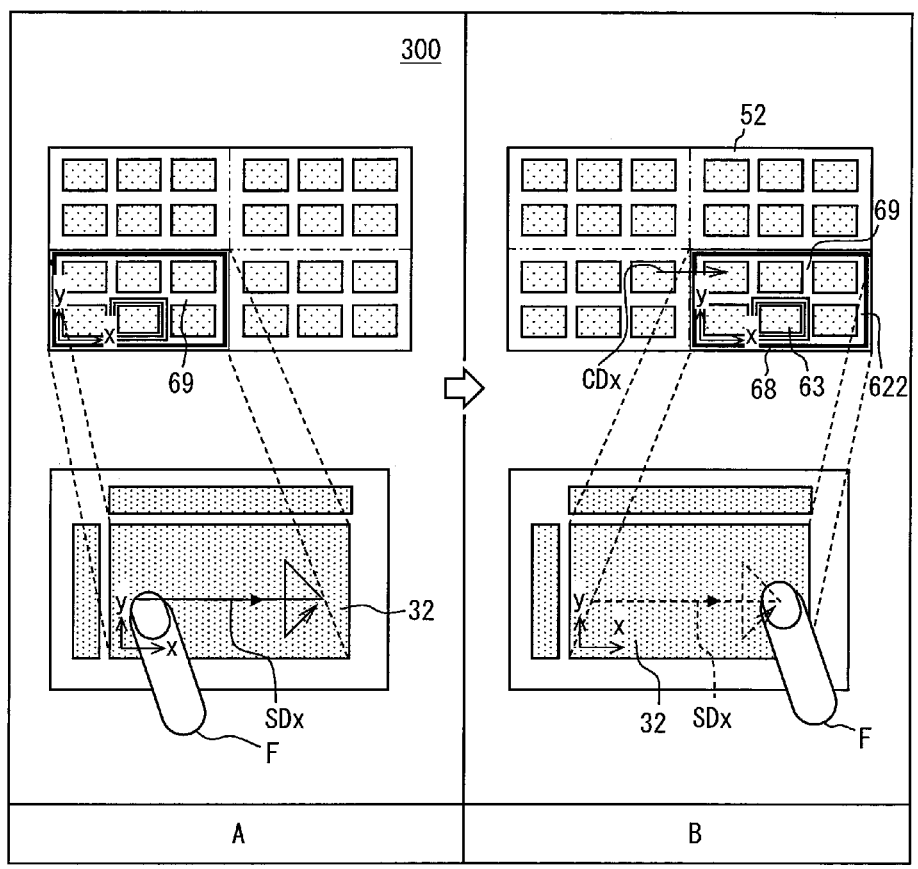
FIG. 12 is a drawing illustrating the movement of an active region changing in the x-axis direction by an operation to a main input screen in a display system according to a third embodiment.
Figure 13:
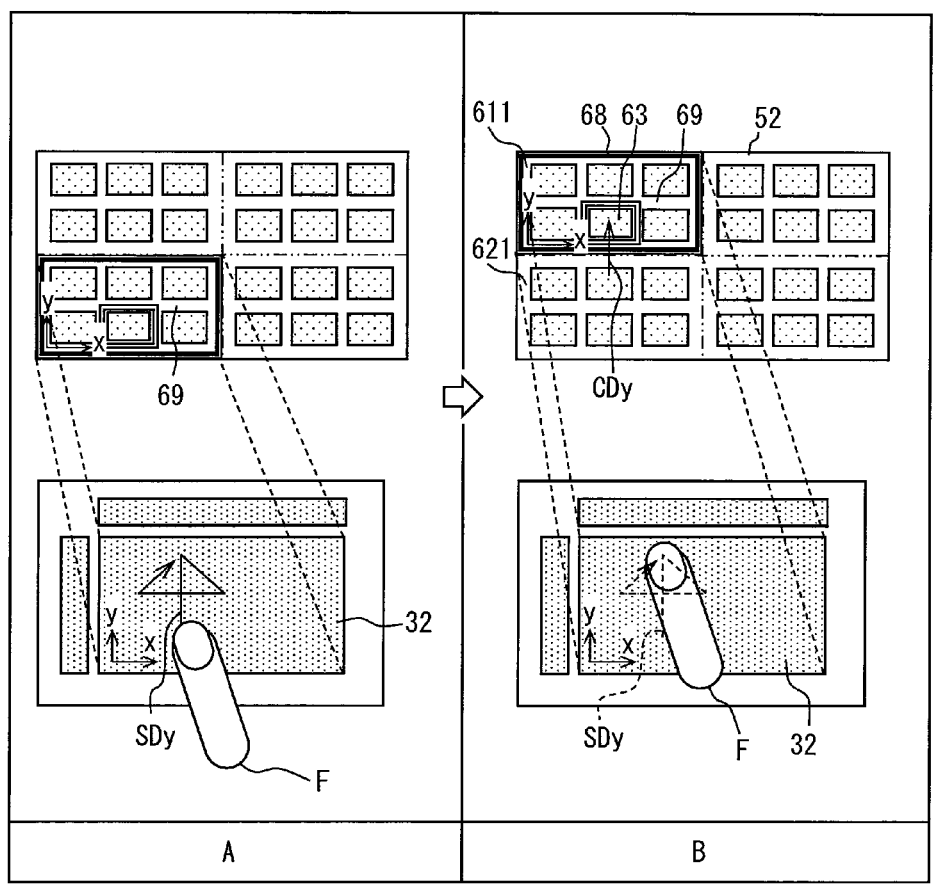
FIG. 13 is a drawing illustrating the movement of an active region changing in the y-axis direction by an operation to the main input screen in the display system according to the third embodiment.

The third embodiment illustrated in FIG. 12 and FIG. 13 is another modified example of the first embodiment. In a display system 300 according to the third embodiment, an operation to move a finger F so as to draw an arrow as a specific locus is stored in a display control unit 53 (refer to FIG. 1) in advance as a switching operation. Hereinafter, in the third embodiment, an operation to move the active region 69 by an input to the main input screen 32 is explained with reference to FIG. 12 and FIG. 13.

As illustrated in the part A of FIG. 12, it is assumed that an operation to move one finger F so as to draw an arrow pointing a specific direction SDx along the x-axis direction is inputted to the main input screen 32. Then, as illustrated in the part B of FIG. 12, the active region 69 moves on the display screen 52 in a direction CDx along the x-axis direction of the display coordinate system, the direction CDx being the corresponding direction to the specific direction SDx in which the finger F moves. As described above, the icon 63 included in the display region 622 which has been selected as the active region 69 and surrounded by the active-region indicating frame 68 becomes selectable by the selection operation inputted into the main input screen 32.

As illustrated in the part A of FIG. 13, it is assumed that an operation to move one finger F so as to draw an arrow pointing a specific direction SDx along the x-axis direction is inputted to the main input screen 32. Then, as illustrated in the part B of FIG. 13, the active region 69 moves on the display screen 52 in a direction CDy along the y-axis direction of the display coordinate system, the direction CDy being the corresponding direction to the specific direction SDy in which the finger F moves. As described above, the icon 63 included in the display region 611 which has been selected as the active region 69 and surrounded by the active-region indicating frame 68 becomes selectable by the selection operation inputted into the main input screen 32.

In order to realize the above described switching of the active regions 69, at S104 (refer to FIG. 8) of the input process in the third embodiment, it is assumed that the direction pointed by the arrow drawn on the main input screen 32 is the specific direction SDx (or SDy) in the input coordinate system. Then, at S104, it is further assumed that the direction corresponding to the specific direction SDx (or SDy) is the corresponding direction CDx (or CDy), and the display control unit 53 (refer to FIG. 1) determines whether there is a non-active region in the corresponding direction CDx (or CDy) of the present active region 69.

According to the third embodiment explained hitherto, the operator can also perform continuously the switching operation for switching the active region 69 and the selection operation for selecting the icon 63, while continuing the input to the main input screen 32. Therefore, even by the display system 300 according to the third embodiment, it is possible to avoid complicated operations for selecting the desired icon 63.

Fourth Embodiment

Figure 14:
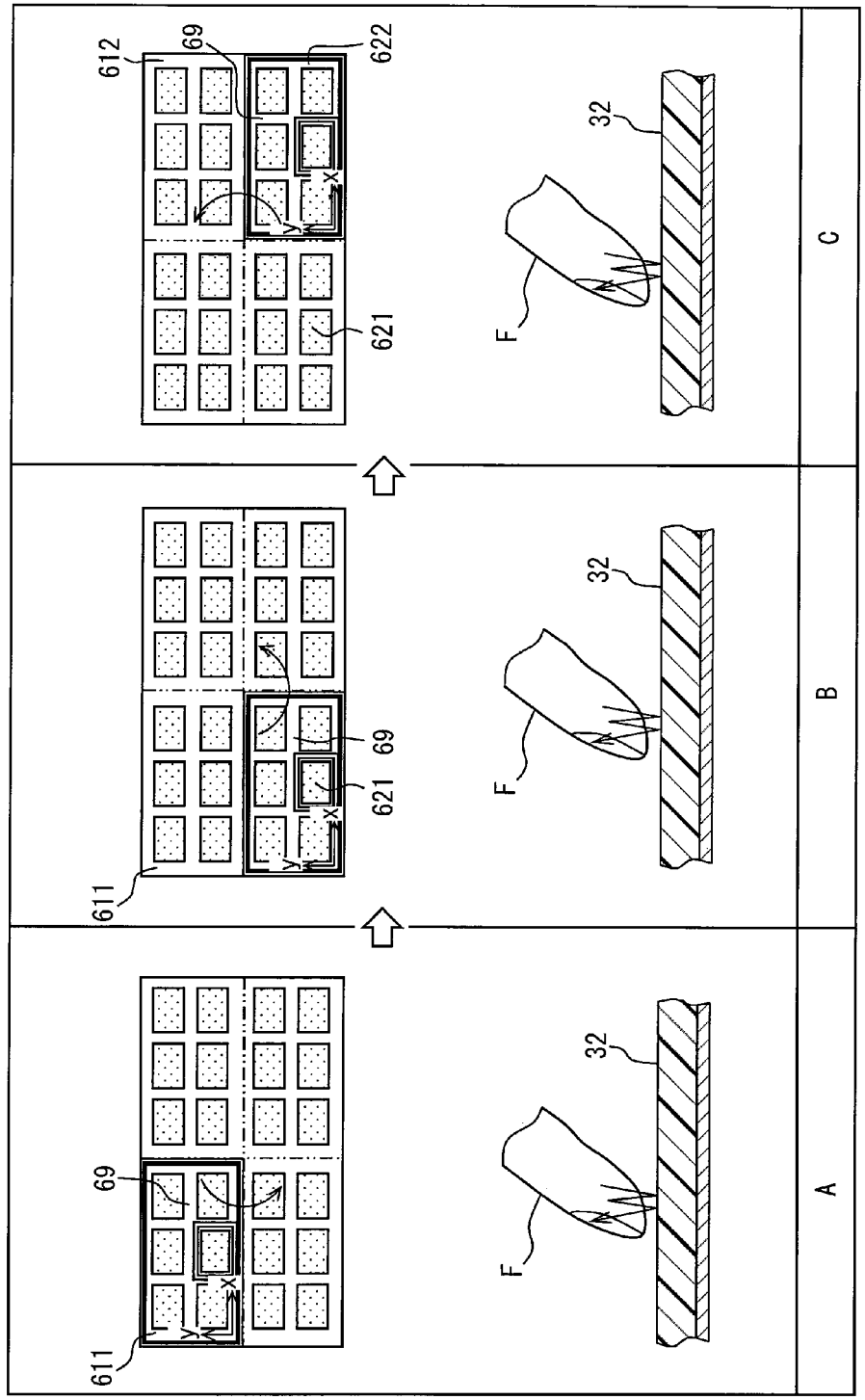
FIG. 14 is a drawing illustrating the movement of an active region changing counterclockwise by an operation to a main input screen in a display system according to a fourth embodiment.
Figure 15:
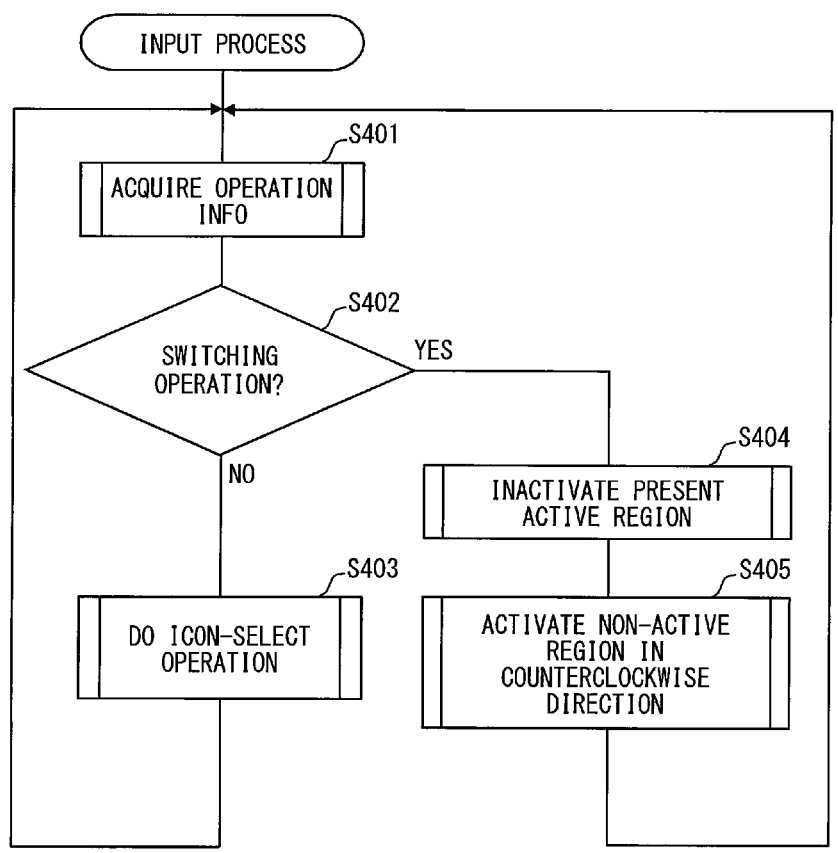
FIG. 15 is a flow chart illustrating an input process performed by a display control unit in the display system according to the fourth embodiment.

The fourth embodiment illustrated in FIG. 14 and FIG. 15 is yet another modified example of the first embodiment. A display control unit 53 (refer to FIG. 1) in the fourth embodiment stores a two-time tapping operation (hereinafter called a "double tap operation") inputted to the main input screen 32 with a finger F within a prescribed time (for example, about 0.5 to 1.0 second) as a switching operation. Hereinafter, in the fourth embodiment, an operation to move the active region 69 by an input to the main input screen 32 is explained with reference to FIG. 14.

As illustrated in the part A of FIG. 14, when a double tap operation with one finger F is inputted to the main input screen 32, the active region 69 moves from the display region 611 to the display region 621 located in the counterclockwise direction of the display region 611, as illustrated in the part B of FIG. 14. When a double tap operation with the finger F is furthermore inputted to the main input screen 32, the active region 69 moves from display region 621 to the display region 622 located in the counterclockwise direction of the display region 621, as illustrated in the part C of FIG. 14. Then, when a double tap operation with the finger F is furthermore inputted to the main input screen 32, the active region 69 moves from the display region 621 to the display region 612 located in the counterclockwise direction of the display region 621.

In order to realize the counterclockwise movement of the active regions 69 as described above, the input process performed by the display control unit 53 (refer to FIG. 1) is illustrated in FIG. 15. In the input process illustrated in FIG. 15, Steps S401-S404 are substantially same as Steps S101-S103 and S105 of the first embodiment (refer to FIG. 8). At S405, a non-active region located in the counterclockwise direction to the display region which has been the active region 69 until just before is newly changed to an active region 69, and the flow returns to S401.

According to the fourth embodiment explained hitherto, the operator can also perform continuously the switching operation for switching the active region 69 and the selection operation for selecting the icon 63, while continuing the input to the main input screen 32. In addition, by assigning the easy input operation of the double tap operation as the switching operation, it is possible for the operator to perform continuously the switching operation and the selection operation easily.

Other Embodiments

As described above, the present disclosure has been explained based on several embodiments, however the embodiment of the present disclosure is not restricted to the embodiments described above, and the present disclosure can be applied to various embodiments and a combination of some of them, in the range which does not deviate from the gist of the present disclosure.

Figure 16:
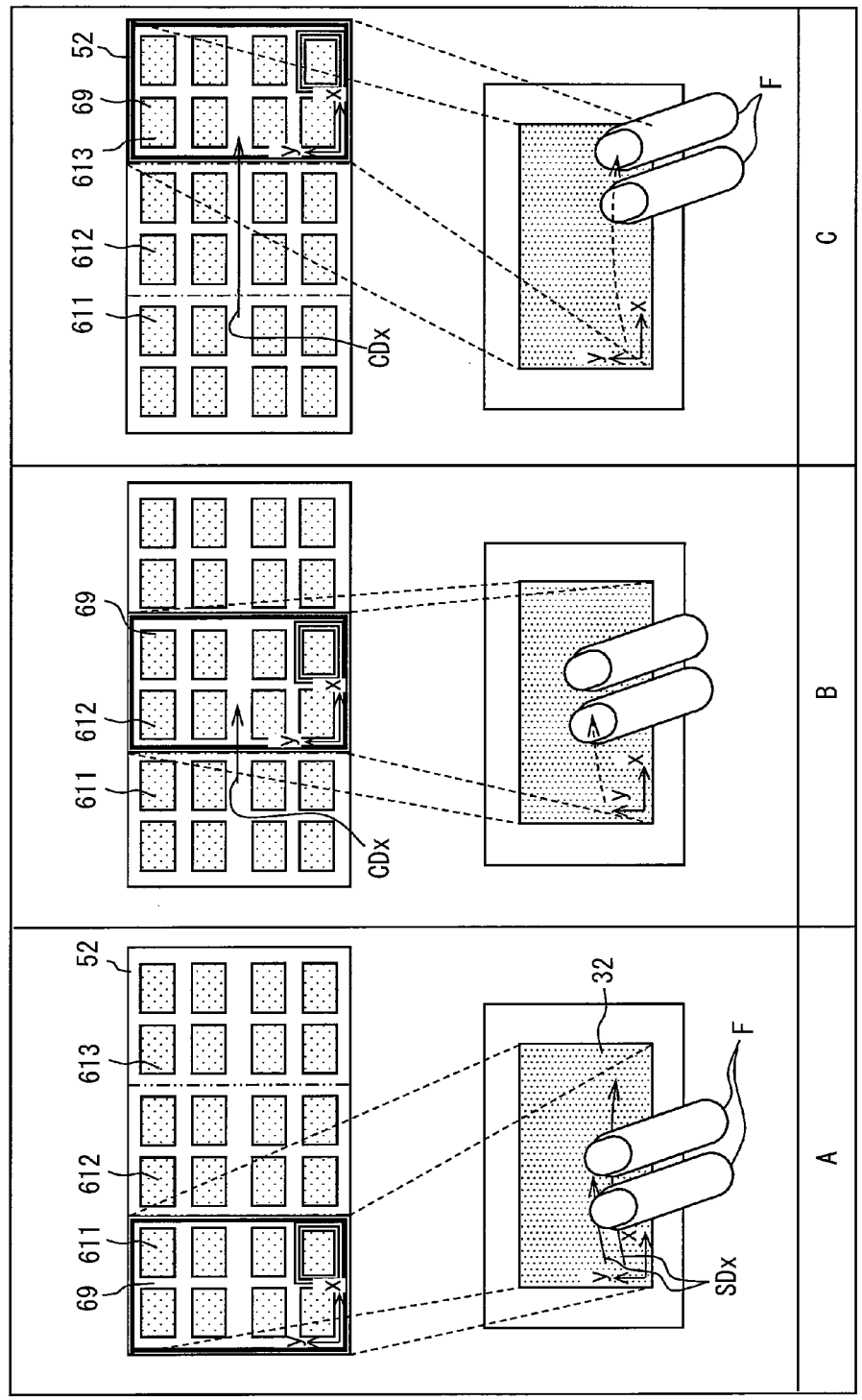
FIG. 16 is a drawing illustrating a modification of FIG. 6.

As illustrated in the part A of FIG. 16, it is assumed that three display regions 611, 612, and 613 arranged along the x-axis direction of the display coordinate system are defined on the display screen 52. In such a case, to a flick operation with two fingers F in the specific direction SDx, the moving destination of the active region 69 is determined on the basis of the shift amount of two fingers F in the specific direction SDx concerned. Specifically, in the flick operation, when the shift amount of two fingers F in the specific direction SDx is less than a threshold, the active region 69 moves from the display region 611 to the display region 612 which adjoins the display region 611 concerned in the corresponding direction CDx as illustrated in the part B of FIG. 16. Here, the threshold of the shift amount is about half the x-axis direction length of the main input screen 32, for example.

In contrast with this, when the shift amount of two fingers F in the specific direction SDx exceeds the above-described threshold, as illustrated in the part C of FIG. 16, the active region 69 moves from the display region 611 to the display region 613 located in the corresponding direction CDx and in the opposite side of the display region 611 with the display region 612 intervening therebetween. As described above, when three or more display regions are located in a line on the display screen 52, it is possible for the active region 69 to move, skipping the display region 621 located in the middle; accordingly, the operability of the display system improves further.

As illustrated in FIG. 16, the sub input screens 35 and 36 may be omitted from the touchpad. Alternatively, either the sub input screen 35 or the sub input screen 36 may be provided in the touchpad. By eliminating each of the sub input screens 35 and 36 from the touchpad in this way, it becomes easy to secure the area of the main input screen 32.

The configuration which defines the display regions on the display screen is not restricted to those illustrated in the embodiments. For example, it is preferable to define three or more display regions in a line in the y-axis direction of the display screen 52. In addition, it is preferable that each of the display regions has different dimensions with each other. In addition, in lieu of the above-described focus 64, a pointer, which moves on the display screen corresponding to the input position on the main input screen and is superimposed with each icon 63, may be displayed on the active region.

In addition, it is also preferable that the operator can change the switching operation specified to the display control unit or the operation control unit in advance. For example, it is preferable that the display system may be configured such that, in lieu of the flick operation with two fingers as illustrated in the first embodiment, an operation to draw a circle as illustrated in the second embodiment and a multiple-time tap operation as illustrated in the fourth embodiment, etc. are set up as a switching operation. Furthermore, it is preferable that the display system switches the active region in response to an input falling into at least one of multiple switching operations.

According to the embodiment described above, the audio status image and the air-conditioner status image have been exemplified as an image displayed on the display region. However, the image to be displayed on each display region is not restricted to the above-described images. In addition to these images, a photographed image of the surroundings of the vehicle, a map image for guiding to a destination, etc. may be displayed on either of the display regions.

According to the embodiment described above, the liquid crystal display 51 has embodied the "display screen" described in the claim. However, it is also preferable that a display device using a plasma-display panel, a display device using an organic electroluminescence, etc. embody the "display screen." Furthermore, it is preferable that the display system includes a display device which utilizes a window shield, a combiner provided in the upper part of an instrument panel, etc. as a "display screen", and projects an image onto the window shield, the combiner, etc. by a projection means such as a projector.

According to the embodiment described above, both the specific direction and the corresponding direction have been set along one of the axial directions in the input coordinate system or the display coordinate system. However, the specific direction and the corresponding direction may be changed suitably, according to the arrangement of each display region on the display screen.

According to the first embodiment and others, processing to detect an operation inputted, processing to determine whether the inputted operation is the switching operation or not, processing to switch the active region 69, and processing to select the icon 63 in the active region 69 have been performed by the display control unit 53. On the other hand, according to the second embodiment, these kinds of processing have been performed by the operation control unit 33. Such a function corresponding to the detection means (detection unit), the determination means (determination unit), and a switching means (switching unit) may be achieved by the display control unit of the display device, or may be achieved by the operation control unit of the operating device. Furthermore, the function corresponding to the detection means (detection unit), the determination means (determination unit), the switching means (switching unit), and the image selection means (image selection unit) may be achieved by cooperation of the display control unit and the operation control unit. Alternatively, a circuit or a device which achieves the function corresponding to the detection means (detection unit), the determination means (determination unit), the switching means (switching unit), and the image selection unit (image selection means) may be provided in the display system separately from the display control unit and the operation control unit described above. The control unit, the circuit, the device, etc. which achieve each function may be configured such that the prescribed function is achieved by executing a program, or may be configured such that the prescribed function is achieved without a program. The program is stored in a non-transitory physical storage medium, for example.

According to the present disclosure, it is possible to provide a display system of various aspects.

For example, a display system according to a first aspect is a display system defining on a display screen multiple display regions. Each display region displays selective image sections which are to be selected by an operation inputted into an input screen. The display system includes an input screen, a display screen, a determination unit, and a switching unit. The input screen is located apart from the display screen and inputs a selection operation for selecting the selective image section. The display screen displays, as an active region, one display region selected among the multiple display regions in a manner that e the selective image sections on the active region are selectable based on the selection operation. A specific operation to be inputted to the input screen is pre-stored as a switching operation in the determination unit. The determination unit determines whether an operation inputted to the input screen is the switching operation. The switching unit switches the active region from the one display region to another display region of the multiple display regions when the determination unit determines that the switching operation is inputted.

A display system according to a second aspect selects one display region in multiple display regions defined on a display screen as an active region by an input operation to an input screen provided apart from the display screen and selects a selective image section in the selected active region by another input operation to the input screen. The display system includes a detection unit, a memory unit, a determination unit, a switching unit, and an image selection unit. The detection unit detects the input operation to the input screen. Multiple specific input operations corresponding to respective multiple display regions are pre-stored as the respective switching operations in the memory unit. The determination unit determines which of the switching operations corresponds to the input operation detected by the detection unit. The switching unit selects the display region corresponding to the switching operation as the active region and displays the selective image sections in the active region as being in a selectable state when the determination unit determines that the input operation is one of the switching operations. When the determination unit determines that the input operation is not any of the switching operations, the image selection unit selects the selective image section in the presently-selected active region on the basis of the input operation.

Such a display system may be configured such that an operation to the input screen by multiple operation bodies is stored as the switching operation in the determination unit, and the switching unit switches the active region from the one display region to another display region when the determination unit determines that the switching operation by the multiple operation bodies is inputted.

It may be preferable to configure the display system as follows. The display system is provided with an input coordinate system defined on the input screen and a corresponding display coordinate system defined on the display screen. An operation of moving the multiple operation bodies in a specific direction in the input coordinate system is stored as the switching operation in the determination unit. When the determination unit determines that the switching operation is inputted, the switching unit defines a direction in the display coordinate system corresponding to the specific direction as the corresponding direction and switches the active region to another display region that is located in the corresponding direction with respect to the one display region.

The display system may be configured such that a flick operation to the input screen by an operation body is stored as the switching operation in the determination unit, and the switching unit switches the active region from the one display region to another display region when the determination unit determines that the flick operation is inputted.

The display system may be configured such that an operation of moving an operation body drawing a specific locus is stored as the switching operation in the determination unit, and the switching unit switches the active region from the one display region to another display region when the determination unit determines that the switching operation drawing the specific locus is inputted.

The display system may be configured such that the display system is provided with an input coordinate system defined on the input screen and a corresponding display coordinate system defined on the display screen. When the determination unit determines that the switching operation drawing the specific locus is inputted, the switching unit acquires, after the switching operation, a move operation of moving the operation body in a specific direction in the input coordinate system, and the switching unit defines a direction in the display coordinate system corresponding to the specific direction as the corresponding direction and switches the active region to another display region that is located in the corresponding direction with respect to the one display region.

The display system may be configured such that multiple tap operations inputted to the input screen by the operation body within a prescribed time is stored as the switching operation in the determination unit, and the switching unit switches the active region from the one display region to another display region when the determination unit determines that the multiple tap operations is inputted.

Alternatively, a display device for the above-described display system may form the display screen may comprise the determination unit and the switching unit.

An operation device for the above-described display system may form the input screen and may comprise the determination unit and the switching unit.

The display system may be configured such that the input screen is a single input screen formed in a specific region of a touchpad, and the same single input screen of the touchpad receives both of a switching operation and a selection operation. The switching operation is an input operation for selecting the active region. The selection operation is an input operation for selecting the selective image sections in the active region and is different in input gesture manner from the switching operation.

According to such a display system, when the operator of the display system inputs to the input screen a specific switching operation stored in advance, the active region in which a selective image section is selectable is switched from one display region, which has been the active region till then, to another display region. Therefore, the operator can perform continuously the switching operation for switching an active region among the multiple display regions, and the selection operation for selecting the selective image section in the display region chosen as an active region, while continuing the input of the operation to the input screen. In this way, even in the display system in which multiple display regions for displaying the selective image section are defined and one of the multiple display regions is chosen as the active region, it is possible to avoid complicated operations for selecting a desired selective image section.

The embodiments, the configurations, and the aspects according to the present disclosure have been illustrated in the above. However, embodiments, configurations, and aspects according to the present disclosure are not limited to respective embodiments, respective configurations, and respective aspects described above. For example, embodiments, configurations, and aspects obtained by combining suitably the technical parts disclosed in the different embodiments, configurations, and aspects are also included in the technical scope of embodiments, configurations, and aspects according to the present disclosure.

What is claimed is:

1. A display system comprising:
a display screen that defines thereon a plurality of display regions each displaying a plurality of selective image sections which are to be selected by an operation inputted into an input screen, wherein:
the display screen displays, as an active region, one display region selected from among the plurality of display regions in a manner that only the selective image sections on the active region are selectable based on a selection operation inputted to the input screen, the display screen having a display coordinate system defined on the display screen;
the input screen is located apart from the display screen and inputs the selection operation for selecting the selective image section, the input screen having an input coordinate system defined on the input screen corresponding to the display coordinate system;
the display system further comprising at least one control unit, each having a processor and memory, a specific operation to be inputted to the input screen corresponding to a gesture of drawing a specific locus being pre-stored as a switching operation in the memory, the at least one control unit determining whether the switching operation is inputted to the input screen and switching the active region from the one display region to another display region of the plurality of display regions when the at least one control unit determines that the switching operation is inputted;
wherein there are one or more pre-stored switching operation, each switching operation correspond to a gesture of drawing a specific locus which is different and distinct from the selection operation inputted into the input screen for selecting the plurality of selective image;
wherein when the at least one control unit determines that a first gesture of the switching operation drawing a specific locus of circle is inputted, the at least one control unit:
upon determining that the first gesture of the switching operation drawing the circle is inputted to the input screen, the at least one control unit determines whether or not a second gesture of a move operation of linearly moving an operation body in a specific direction in the input coordinate system following the first gesture of switching operation drawing the circle is detected, wherein the first and second gesture forms a compound gesture and are performed as a single continuously gesture without the operation body lifting off the input screen;
upon the at least one control unit determining that the move operation of linearly moving the operation body in the specific direction in the input coordinate system following the switching operation drawing the circle is not detected, the at least one control unit switches the active region from the one display region into the another display region located in a counterclockwise direction with respect to the one display region in the display coordinate system;
upon the at least one control unit determining that the move operation of linearly moving the operation body in the specific direction in the input coordinate system following the switching operation drawing the circle is detected, the at least one control unit defines a direction in the display coordinate system corresponding to the specific direction as a corresponding direction, switches the active region from the one display region into the another display region located in the corresponding direction with respect to the one display region in display coordinate system.

2. The display system according to claim 1, wherein the display system further comprises a display device, with the display device forming the display screen and comprising the at least one control unit.

3. The display system according to claim 1, wherein the display system further comprises an operation device, with the operation device forming the input screen and comprising the at least one control unit.

4. The display system according to claim 1, wherein:
the input screen is a single input screen formed in a specific region of a touchpad; and
the same single input screen of the touchpad receives both the switching operation and the selection operation, the switching operation being an input operation for selecting the active region, the selection operation being an input operation for selecting the selective image section in the active region, and the selection operation being different in input gesture manner from the switching operation.

5. The display system according to claim 1, wherein:
the at least one control unit determines whether or not a second switching operation drawing a specific locus is inputted to the input screen;
upon determining that the second switching operation drawing the specific locus is inputted to the input screen, the at least one control unit determines whether or not a second move operation of linearly moving the operation body in a second specific direction in the input coordinate system following the second switching operation drawing the specific locus is detected; and
upon the at least one control unit determining that the second move operation of linearly moving the operation body in the specific direction in the input coordinate system following the second switching operation drawing the specific locus is detected, the at least one control unit switches the active region from the current active display region into a second display region located in the second specific direction with respect to the current active display region in the display coordinate system.

6. The display system according to claim 1, wherein the at least one control unit includes a display control unit located with the display screen and separate from the input screen.

7. The display system according to claim 1, wherein the at least one control unit includes an operation control unit located with the input screen and separate from the display screen.

8. The display system according to claim 1, wherein the at least one control unit includes (i) a display control unit located with the display screen and separate from the input screen and (ii) an operation control unit located with the input screen and separate from the display screen.

9. A system comprising:
- a display screen having a display coordinate system defined on the display screen, the display screen being configured to display a plurality of display regions, each display region displaying a plurality of icons;
- a touchpad located separately from the display screen, the touchpad having an input coordinate system defined on the touchpad, the input coordinate system corresponding to the display coordinate system; and
- at least one control unit, each having a processor and memory, configured to receive input from the touchpad and to control the display screen;
- the display screen being configured to display a first display region selected from the plurality of display regions as an active display region, with only the plurality of icons corresponding to the active display region being selectable by an icon selection operation performed on the touchpad, the icon selection operation including selecting an icon from the plurality of icons by tapping the touchpad at a touchpad location within the input coordinate system that corresponds to an icon location of the selected icon within the display coordinate system, and
- wherein the memory stores at least one pre-stored switching operation, each switching operation of the at least one pre-stored switching operation corresponding to a gesture of drawing a specific locus which is different and distinct from the icon selection operation performed on the touchpad for selecting an icon from the plurality of icons; and
- wherein when the at least one control unit determines that a first gesture of the switching operation drawing a specific locus of circle is inputted, the at least one control unit:
  - upon determining that the first gesture of the switching operation drawing the circle is inputted to the touchpad, the at least one control unit determines whether or not a second gesture of a move operation of linearly moving an operation body in a specific direction in the input coordinate system following a first gesture of switching operation drawing the circle is detected, wherein the first and second gesture forms a compound gesture and are performed as a single continuously gesture without the operation body lifting off the touchpad;
  - upon the at least one control unit determining that the move operation of linearly moving the operation body in the specific direction in the input coordinate system following the switching operation drawing the circle is not detected, the at least one control unit switches the active display region from the first display region into a second display region located in a counterclockwise direction with respect to the first display region in the display coordinate system;
  - upon the at least one control unit determining that the move operation of linearly moving the operation body in the specific direction in the input coordinate system following the switching operation drawing the circle is detected, the at least one control unit defines a direction in the display coordinate system corresponding to the specific direction as a corresponding direction, switches the active display region from the first display region into the second display region located in the corresponding direction with respect to the first display region in display coordinate system.

10. The system according to claim 9, wherein the specific locus of the gesture of the switching operation corresponds to at least one of a circle and a semi-circle.

11. The system according to claim 9, wherein the display screen is located within an instrument panel of a vehicle.

12. The system according to claim 9, wherein the touchpad is located within a center console of a vehicle.

* * * * *